United States Patent

[11] 3,543,660

| [72] | Inventor | Heinz Waaske<br>Braunschweig-Runingen, Germany |
|---|---|---|
| [21] | Appl. No. | 663,097 |
| [22] | Filed | Aug. 24, 1967 |
| [45] | Patented | Dec. 1, 1970 |
| [73] | Assignee | Rollei-Werke Franke & Heidecke<br>Braunschweig, Germany<br>a firm of Germany |
| [32] | Priority | Aug. 30, 1966, Sept. 3, 1966, Sept. 3, 1966,<br>Sept. 3, 1966, Sept. 27, 1966 |
| [33] | | Germany |
| [31] | | Nos. R 44021, R 33467, R 33468, R 33469<br>and R 33593 |

[54] PHOTOGRAPHIC CAMERA
11 Claims, 7 Drawing Figs.

[52] U.S. Cl. .................................................... 95/11,
95/39, 95/64
[51] Int. Cl. .......................................................... G03b 17/04
[50] Field of Search ............................................ 95/10C, 11,
31, 32, 39, 45, 64; 116/114.10(Inquired)

[56] References Cited
UNITED STATES PATENTS

| 2,397,915 | 4/1946 | Bolsey | 95/64 |
|---|---|---|---|
| 2,231,730 | 2/1941 | Mihalyi | 95/32X |
| 2,402,149 | 6/1946 | Crumrine | 95/31 |
| 2,766,669 | 10/1956 | Weisse et al. | 95/31 |
| 2,773,437 | 12/1956 | Knauf | 95/11 |
| 2,932,242 | 4/1960 | Greger | 95/11X |
| 3,116,672 | 1/1964 | D'Oplinter | 95/45X |
| 3,291,023 | 12/1966 | Starp | 95/64 |

FOREIGN PATENTS

| W-10,307 | 2/1956 | Germany | 95/39 |
|---|---|---|---|

Primary Examiner—John M. Horan
Assistant Examiner—Fred L. Braun
Attorney—Charles Shepard and Stonebraker & Shepard ABSTRACT: A photographic camera having a lens in a tube movable axially forwardly when pictures are to be taken, and axially rearwardly to a collapsed space-saving position when the camera is not in use. The shutter blades and diaphragm leaves are mounted in the tube and move axially with it, but the operating mechanism for the shutter and diaphragm is mounted in the camera body, operating connections being established by the act of moving the tube forwardly to picture-taking position. A lever differential system connects the shutter and diaphragm adjusting knobs to a followup pointer of a light meter. Details of mounting various parts in a space-saving manner are disclosed.

PHOTOGRAPHIC CAMERA

CROSS-REFERENCES TO RELATED APPLICATIONS

The present invention deals with certain features of construction of a small compact camera, other features of construction of the same camera being disclosed in the present applicant's copending U.S. Pat. applications, Ser. No. 553,077, filed May 26, 1966(now Pat. 3,470,804, granted Oct. 7, 1969), and Ser. No. 557,495, filed June 14, 1966 (now U.S. Pat. No. 3,444,796, granted May 20, 1969). The subject matter of these previous applications is incorporated herein by reference. Familiarity with the disclosures of the previous applications will help in quickly understanding the subject matter of the present application.

BACKGROUND OF THE INVENTION

The constructions disclosed in the present application and in the above mentioned related applications are intended especially, although not exclusively, for a small and very compact hand camera adapted to take still photographs of the conventional 24 × 36 mm. size on conventional 35 mm. film.

The compactness of the camera is due in part to the fact that the lens, the shutter blades, and the diaphragm leaves are mounted in a tube which is pulled forwardly when pictures are to be taken, and which is pushed rearwardly, partly into the space within the camera body, when not in use. Cameras having such tubes are known in general; see, for example, Meixner U.S. Pat. No. 2,732,776, granted Jan. 31, 1956, and Meixner U.S. Pat. No. 2,865,273, granted Dec. 23, 1958, and Rentschler U.S. Pat. No. 2,890,638, granted June 16, 1959. The details of the present camera, however, are an improvement upon the constructions shown in said patents. The use of the features disclosed in the present application in combination with the features disclosed in the prior related applications enables the construction of a camera capable of taking high quality pictures on 35 mm. film, with the unusually small dimensions of a height of 60 mm., a length of 97 mm., and a depth (in the direction of the optical axis) of 32 mm., when the lens tube is in its rearward or collapsed position. Those skilled in the art will recognize that these dimensions are unusually small for a camera using this size of film, and are as small, or almost as small, as those or prior cameras using 16 mm. film.

There have been various attempts in the prior art to provide 35 mm. cameras of very compact size. Such prior art cameras have usually been provided with a slotted curtain shutter, often called a focal plane shutter, but the space required for the rollers and other parts of the operating mechanism of the curtain shutter have inevitably lead to a certain increase in the dimensions of the camera housing. Attempts have been made to provide an objective shutter or between the lens shutter in 35 mm. cameras, but in the prior art this has not been satisfactory with cameras in which lens tubes are projected forwardly for picture taking and retracted rearwardly when the camera is not in use. If a conventional between the lens shutter is mounted on a retractable lens tube, this leads to an increase in the diameter of the tube, thus preventing the latter from being pushed back into the housing to the same extent as is possible when a curtain shutter is used. Another proposal in the prior art has been to mount an objective shutter on the camera body, and to push the lens tube rearwardly into the camera body (when the camera is not in use) through the opened shutter, but this is not satisfactory because it requires a shutter of excessively large size, and also requires additional driving mechanism to open the shutter when the lens tube is to be retracted through it, and an auxiliary shutter in front of the film to protect the film from light when the main shutter is opened to permit the lens tube to be retracted.

These and other drawbacks of the prior art are overcome according to the present invention, by providing a construction in which only the shutter blades and diaphragm leaves are mounted in the lens tube, in the most advantageous and correct positions in an axial direction, while the driving mechanism for the shutter blades and the adjusting mechanism for the diaphragm leaves are mounted in the camera body on each side of the lens tube, in the otherwise waste space between the lens tube and the film cassette chamber on one side of the lens tube and the winding spool chamber on the other side of the lens tube. The shutter blades and diaphragm leaves are operated from the mechanism mounted within the camera body as aforesaid, by operating connections which are automatically established when the lens tube is moved forward to picture-taking position, and are automatically disconnected when the lens tube is moved rearwardly to collapsed position to make the camera more compact when it is not in use. Other features of the invention, such as a flat lever differential system for controlling a light meter followup pointer from the adjusting knobs on the front wall of the camera, and an advantageous light meter assembly, and an advantageous placing of the main operating members or devices of the camera on the top wall of the camera housing and subsidiary operating devices on the bottom wall of the camera housing, are described below and will be readily understood as the description proceeds.

BRIEF DESCRIPTION OF THE DRAWINGS

In the accompanying drawings, which are incorporated herein by reference and which constitute an important part of the present disclosure.

DESCRIPTION OF THE PREFERRED EMBODIMENT

Figure 1:
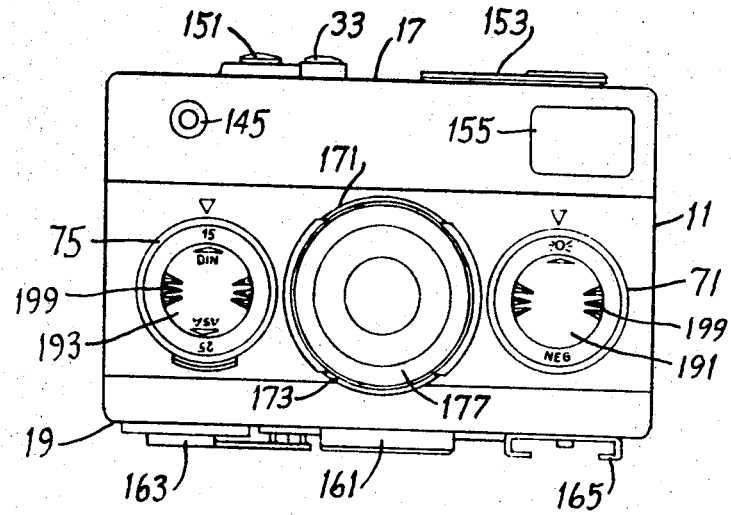
FIG. 1 is front elevation or front face view of a camera in accordance with a preferred embodiment of the invention.

In the preferred illustrative embodiment of the invention, the camera comprises a main body or housing indicated in general at 11, having a front wall 13 (FIG. 3), a rear wall 15, a top wall 17 (FIGS. 1 and 2), and a bottom wall 19 (FIG. 1). The rear wall or a portion thereof is formed as a hinged door, which is a conventional feature well known in the art and therefore not specifically illustrated, so designed that upon opening the door, access may be had to the film cassette chamber 21 at one end of the camera body and a film spool chamber 23 at the other end of the body, for containing the film spool 25 on which the film is wound step by step to bring successive picture exposure areas or "frames" to proper exposure position. In traveling from the cassette in the chamber 21, past the exposure position and onto the spool 25, the film passes over the sprocket 27, the teeth of which successively enter the usual conventional perforations along the margin of the film as customarily used on 35 m.m. film for still cameras. The film winding spool 25 may be placed in the conventional location with respect to the sprocket 27, as shown in FIG. 3, or preferably, if space permits (depending upon the amount of space required for the shutter operating mechanism) the film spool 25 is placed somewhat farther forwardly and closer to the center line of the camera, in the manner disclosed in the above mentioned copending patent application Ser. No. 557,495 (now U.S. Pat. No. 3,444,796), in order to shorten the length of the camera body, and the sprocket 27 is of the form disclosed in said copending application.

The lens tube 31 is slidably mounted on the front wall 13 of the camera, for axial movement forwardly and rearwardly.

The rear end of the tube, in its forward or picture-taking position, is indicated in full lines at 31a (FIG. 3) while the same rear end, in the collapsed or rearward position, is indicated in dot dash lines at 31b. The tube is latched in either its forward or rearward position by any suitable latch preferably of the form disclosed in said related application 553,077, wherein it is seen that the tube must first be turned slightly before it can be moved axially. Movements are accomplished by grasping the knurled ring 37 fixed to the front end of the tube. It is unlatched, to allow movement, by depressing the plunger 33 (FIGS. 1 and 2) on the top wall 17 of the camera body. When the plunger is depressed, it moves the latch lever 33, 34 of said related application 553,077 to an unlatched position.

Mounted within the tube is the objective or lens of known form, typical components of which are indicated schematically at 35. The lens may be of the fixed focus type, but preferably the entire lens or at least the front component thereof is axially movable for focusing, the focusing movement being accomplished by a focusing ring 175, 177 rotatably mounted on the front of the lens tube 31, as further described below.

In a suitable position relative to the lens components, and preferably in a position between two of the axially spaced components, are the diaphragm leaves of a conventional iris diaphragm indicated schematically at 41, and the shutter blades of an objective shutter indicated schematically at 43. However, the shutter operating or driving mechanism for opening and closing the shutter blades, and likewise the operating mechanism for adjusting the size of the diaphragm aperture, are not located in the lens tube but rather are located in the camera body. Thus the lens tube may be considerably smaller than it would have to be if the shutter and diaphragm operating mechanisms were in the lens tube adjacent the shutter blades and diaphragm leaves, respectively.

Preferably the shutter operating mechanism and the diaphragm operating mechanism are substantially of the form shown in said related application Ser. No. 553,077. The master member and various other parts of the shutter mechanism are in the space indicated schematically at 45 in FIG. 3 of the present application, located within the camera body to one side of the lens tube 31, and between the lens tube and the film spool chamber 23. Through operating parts such as shown in said related application 553,077, and here indicated schematically at 47 in FIG. 3 of the present application, the shutter mechanism engages and turns the lever 49 on the rear end of the operating shaft 51 rotatably mounted in the lens tube 31 near one edge thereof, the front end of which carries an arm 53 which operates the conventional shutter blade ring 55 which is coupled to the shutter blades schematically shown at 43 and which serves to open and close them in known manner. The arm 49 at the rear end of the shaft 51 may correspond to the arm 2 shown in said related application 553,077.

The diaphragm operating mechanism is also located within the camera body, on the opposite side of the lens tube 31 from the shutter operating mechanism 45, and between the lens tube and the cassette chamber 21, in the space schematically indicated at 61. This does not require as much space as the shutter operating mechanism. The diaphragm adjusting mechanism may take the form indicated in said related application 553,077, including the parts 36, 37, 41 described in said related application, these parts being here indicated (in FIG. 3 of the present application) schematically at 63 and 65. These parts control the rotation of a shaft 67 located within the lens tube 31 close to the side thereof opposite the shaft 51, and this shaft 67 may correspond to the shaft 3 in said related application 553,077, the forward end of the shaft having an arm 69 coupled to the conventional diaphragm adjusting ring rotatable within the lens tube 31 and serving, when rotated, to vary the aperture formed by the diaphragm leaves, in the conventional way well understood in the art.

As mentioned above, the lens tube requires to be slightly rotated from its operative picture-taking position before it can be moved axially rearwardly to the retracted position. As the tube is rotated, the diaphragm adjusting parts 63 and 65 become automatically disengaged, and when the tube moves rearwardly, the shutter operating parts 47 and 49 separate from each other. When the tube is moved forwardly to the picture-taking position, and is slightly rotated in the opposite direction to lock the tube in the forward position, the operating parts become automatically engaged again, all as will be readily understood by those familiar with the disclosure of said related application 553,077.

The adjusting knob 71 for the shutter speed control is on the front end of a shaft 73 which passes through the front wall 13 of the camera and is appropriately connected in known manner to the shutter operating mechanism in the space 45. The periphery of the knob 71 is marked with appropriate graduations indicating shutter speed or exposure time, read in conjunction with an index mark on the front wall of the camera. The diaphragm aperture adjusting knob 75, on the opposite side of the lens tube from the knob 71, is on the front end of a shaft 77 which passes through the front wall 13 of the camera and appropriately controls the diaphragm aperture. For example, the shaft 77 of this knob may correspond with the shaft 43 in said related application 553,077. The periphery of the knob 75 is graduated with a suitable diaphragm aperture scale, preferably expressed in the familiar conventional $f$ numbers, read in conjunction with an index mark on the front wall of the camera.

In spite of this very compact arrangement, it is possible according to the present invention to couple the knobs 71 and 75 to a followup pointer in the light meter. This is accomplished, according to the present invention, in the manner shown in FIG. 4 of the drawings. A flat disk cam 81, with a generally spiral rise, is mounted on the shaft 73 of the shutter speed adjusting knob, and a similar cam 83 is mounted on the shaft 77 of the diaphragm aperture operating knob. Either or both of these cams can be fixed to their respective shafts, or can be adjustably rotatable with respect to their shafts if it is desired to be able to introduce other factors into the exposure determining system, such as the factor of film speed or sensitivity, or a filter factor.

Figure 4:
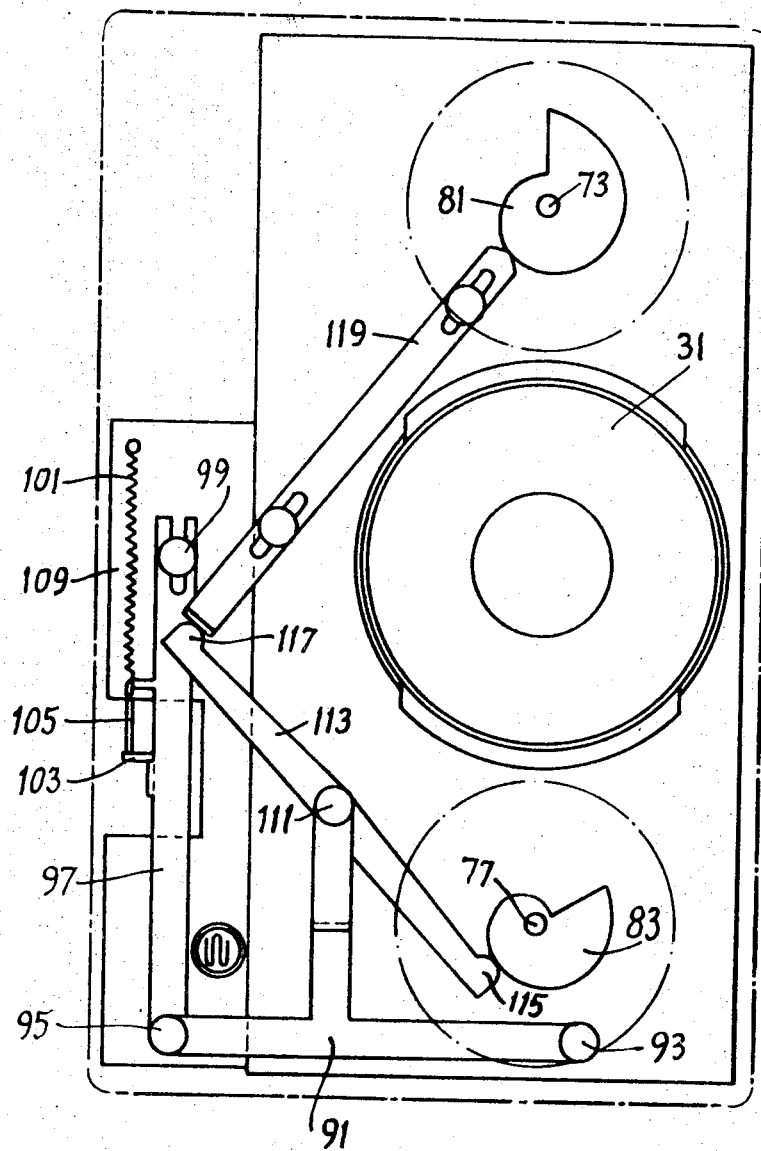
FIG. 4 is a front view of the camera with the front wall removed in order to show certain parts behind the front wall.
Figure 6:
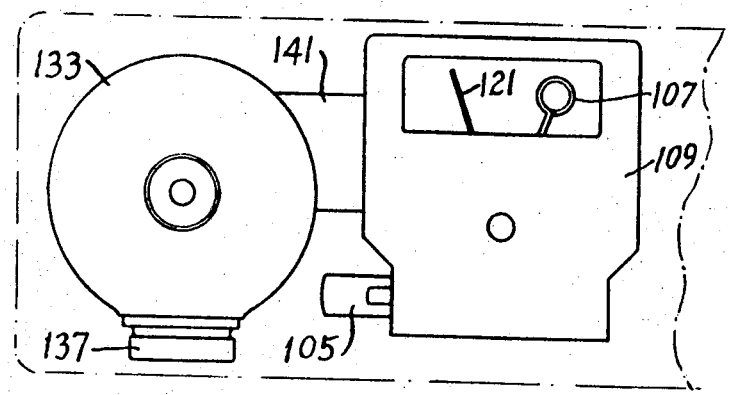
FIG. 6 is a schematic top plan view of the parts shown in FIG. 5.

A flat lever 91 lying just behind the front wall 13 of the camera and occupying very little space in a front-to-rear direction, is pivoted at its lower end on a fixed pivot 93 in the camera body. The upper end of this lever 91 is pivoted at 95 to a horizontally extending bar 97 slidable in the upper part of the camera body just behind the front wall, the other end of the bar 97 being guided by a slot engaged with a stationary stud 99. A tension spring 101 tends to move the bar 97 in one direction. An entrainment device 103 of known form, mounted on or operatively connected to the bar 97, entrains the followup indicator scanning member 105 (FIGS. 4 and 6) of the followup pointer 107 (FIG. 6) of the light meter shown in general at 109 (FIGS. 4 and 6).

A lateral arm on the lever 91 is pivoted at 111 to the two armed lever 113, one end 115 of which rests directly on the cam 83 on the shaft 77, while the other end 117 of the lever 113 rests on one end of a flat bar slide 119, the other end of which rests on the cam 81 on the shutter speed control shaft 73. It will be seen from FIG. 4 that the force of the spring 101 keeps the end 115 of the lever 113 engaged with the cam 83, and keeps the other end 117 engaged with the slide 119 and keeps the latter engaged with the cam 81. These parts collectively constitute a lever differential which controls the position of the member 105 (and therefore of the followup pointer 107) in part from the cam 83 and in part from the cam 81, so that the followup pointer is under the joint influence of the shutter speed adjustment and the diaphragm aperture adjustment. Thus when the needle or pointer 121 (FIG. 6) of the measuring instrument of the light meter occupies a certain position corresponding to the illumination of the scene to be photographed, either or both of the two adjusting knobs 71 and 75 may be turned to such extent as is necessary to bring the followup pointer 107 into alinement with the light meter pointer 121, and the exposure factors will then be adjusted to the proper values for a correct exposure under the prevailing light conditions.

It is noted that the various levers and parts 91, 97, 113, and 119 are all essentially in the form of flat bars, and the cams 81 and 83 are in the form of flat disks, so that all of these parts are very thin in the direction of the optical axis, and do not add materially to the dimensions of the camera in that direction.

The exposure meter has been briefly mentioned above. Another feature of the present invention is the way the exposure meter is preferably mounted.

Figure 5:
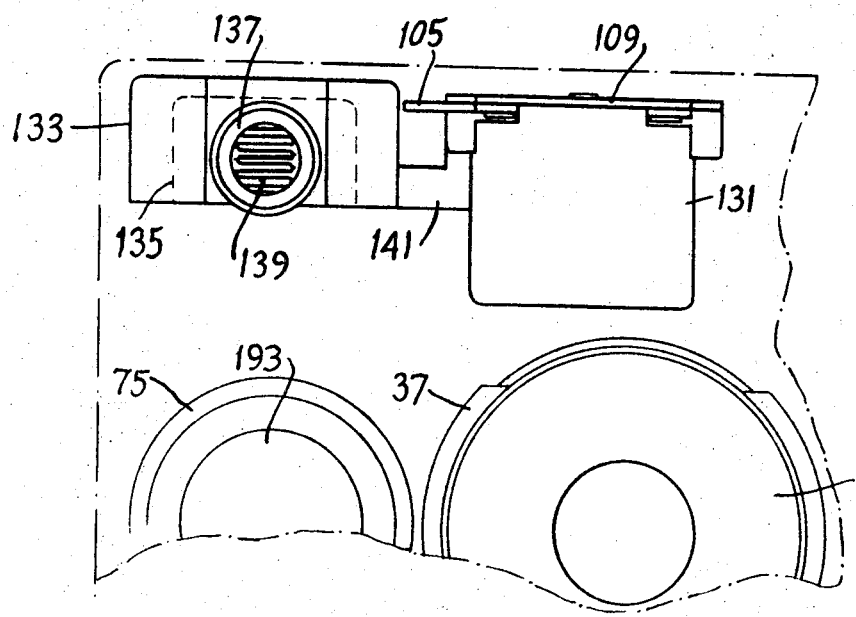
FIG. 5 is a schematic view of a fragment of the front of the camera, with the front wall and other parts removed in order to show certain interior parts.

In the preferred form of mounting according to the present invention, the upper part of the main camera housing contains two small housings or casings connected to each other and together forming a unitary subassembly capable of being quickly mounted in the camera body. Both of the casings are of cylindrical or tubular form, but not necessarily of circular cross section, and have their axes extending vertically. Referring especially to FIGS. 5 and 6, the first of these casings is shown at 131, and is of approximately rectangular outline in horizontal section. It is closed at the bottom and open at the top, and is so designed that the meter portion of the light meter can be dropped into the open top of this casing 131 and is held therein by screws or other conventional fastening means, not shown. The other casing 133 is of approximately circular outline in horizontal section, and is closed at the top and open at the bottom. It constitutes a battery housing, the battery being inserted through the open bottom of the casing 133 when the camera back is open to obtain access to the interior of the camera, and the battery, indicated schematically at 135, is held in place in the casing 133 by suitable spring clips of conventional form, not shown. At the front of the casing is the enlargement 137 containing the photocell or, preferably, a photoresistance schematically indicated at 139 and powered by the battery 135. A tubular flange 141 rigidly connects the two tubular casings 131 and 133 to each other and opens into both of them. The electrical connections from the photoresistance and the battery to the exposure meter 109 pass through the tubular connecting web 141.

The tubular casings 131 and 133 together with the hollow connecting flange 141 thus form a single rigid unit, made from metal or from rigid plastic material, which is easily installed in the camera. The photoresistance and the spring clips for holding the battery are installed in the casing 133, and the measuring instrument portion of the exposure meter is dropped into the open top of the casing 131 and fastened in place, and the electrical connections are completed. Then this subassembly unit is mounted within the top portion of the camera body, held therein by suitable means such as screws, in such position that the photoresistance 139 is behind the window 145 (FIG. 1) in the upper portion of the front wall of the camera body, and in such position that the meter pointer 121 and followup pointer 107 of the exposure meter are beneath the window 147 (FIG. 2) in the top wall 17 of the camera body so as to be visible therethrough.

Another feature of the invention, contributing to the provision of an unusually compact camera, is the location in which the various control or operating parts of the camera are placed. Referring now in FIGS. 1 and 2, the main operating parts of the camera are placed on the top wall of the camera, these main operating parts being the tube latch release member 33 previously mentioned, and the shutter release button or plunger 151 (which may correspond, for example, to the shutter release plunger 20 in said related application 553,077) and the film advance lever 153 which is operated after each exposure to advance the film and cock or tension the shutter, in known manner, ready for the next exposure. Also, the viewfinder 155 is mounted in the upper part of the camera body.

These parts at the top of the camera are the parts or operating members which are constantly used while pictures are being taken. As distinguished from these, subsidiary operating parts which are not used so frequently, are placed on the bottom of the camera. Located approximately centrally on the bottom is the tripod nut 161, having a flat bottom surface and a central hole which is threaded to receive the usual conventional tripod screw, when it is desired to mount the camera on a tripod. Also mounted on the bottom wall of the camera is the hinged rewinding handle 163 which is used in rewinding the exposed film from the spool 25 back into the cassette within the cassette chamber 21, in conventional known manner. This is on one side of the tripod nut 161, in a location beneath the cassette chamber 21. On the opposite side of the tripod nut, near the opposite end of the camera body, is the accessory shoe or guideway 165, which may be used for mounting a flash gun, or an auxiliary viewfinder, or any other desired accessory equipment. Such accessory shoes are well known in the art, except that in the past they have usually been mounted on the top wall of the camera, rather than on the bottom wall thereof, and this has tended to require a top wall of somewhat larger area than is needed according to the present invention.

One of the features of this equipment mounted on the bottom wall of the camera is that all of these members (tripod nut 161, accessory shoe 165, and rewinding handle 163 when in its folded position) project down from the bottom wall of the camera to the same extent, so that the bottom edges of these members lie in a common plane and will all rest firmly on a flat level support such as the top of a table, if the camera is laid thereon.

The separation of the external operating parts or devices of the camera into a main group mounted on the top of the camera, and a subsidiary group mounted on the bottom, contributes to achieving the desired compactness of the camera.

Another feature of the invention which contributes to the compactness of the camera is the manner in which the focusing control is arranged. The lens 35, or at least the front component thereof, is mounted in the usual conventional focusing lens mount within the main tube 31, this focusing lens mount being rotatable as usual and having screw threads or cams causing it to move axially when it is rotated.

Figure 2:
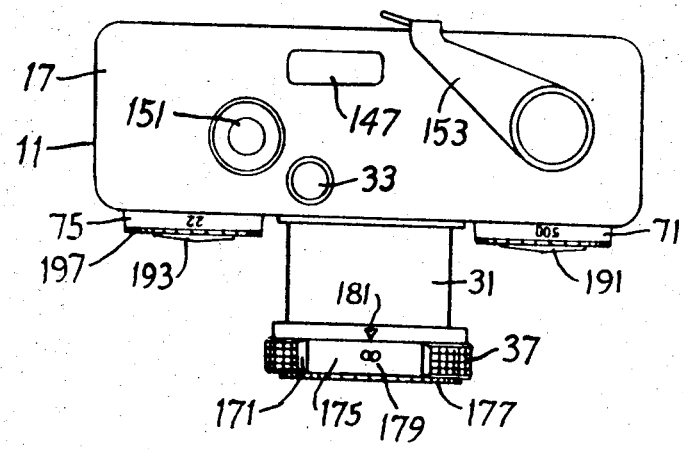
FIG. 2 is a top plan view thereof, with the lens tube in its extended or projected position.
Figure 3:
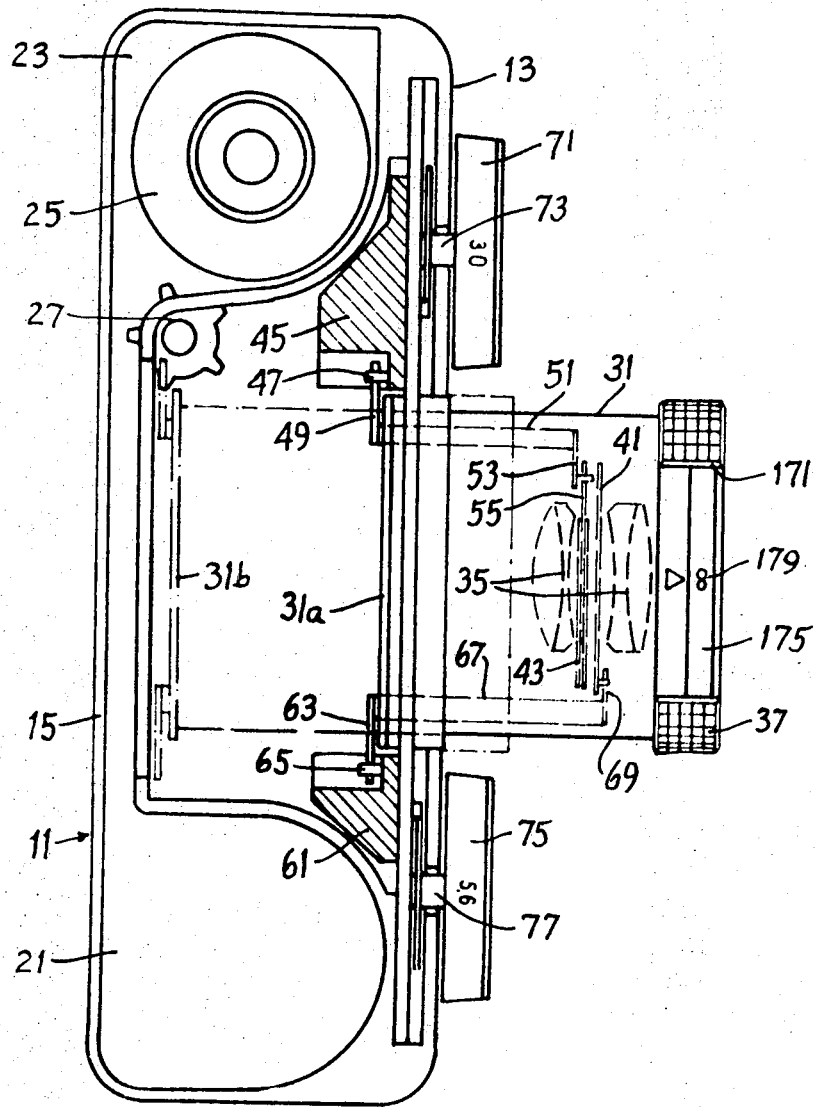
FIG. 3 is a horizontal section through the camera.

As seen in FIGS. 1 and 2, the previously mentioned knurled ring 37 is cut away to form windows, at the top, as at 171, and at the bottom, as at 173, each cutaway portion extending through about one-quarter of the circumference of the ring. Mounted concentrically within this knurled ring 37 is the focusing ring 175 carrying a focusing scale visible through the windows 171 and 173 of the knurled ring. This focusing ring 175 is formed as part of, or is suitably operatively connected to, the conventional axially movable focusing lens mount ring which is within the main tube 31 and which carries at least the front component of the lens. At the front end of the ring 175 is an annular flange 177 extending radially outwardly a short distance, the periphery of this flange being knurled or serrated for easy turning by the fingers. The flange is very thin in the direction of the optical axis, as seen in FIG. 2, and does not materially increase the dimension of the camera in the direction of the optical axis. The outside diameter of the flange 177 is slightly less than the outside diameter of the knurled ring 37 as also seen in FIG. 2, but the diameter of the flange 177 protrudes to a sufficient extent to be accessible in the cutout portions 171 and 173 of the knurled ring 37. Thus the user may grasp the periphery of the flange 177 of the focusing mechanism, between a thumb and a finger placed in the vicinity of the cutout portions 171 and 173, and may easily turn the focusing ring 175, 177 to achieve the desired focusing. The focus distance scale, part of which is shown at 179, appears through the cutout window 171 or 173 as the case may be, and is read in conjunction with a fixed index mark 181 on the ring 37 opposite approximately the center of the top window or cutout part 171, and a similar index mark opposite the center of the other cut out or window 173.

If the maximum extent of rotation of the focusing ring 175, 177 is less than one-half of a complete revolution, as is preferably the case, then two different focusing scales may be employed on the smooth portion 175 of the focusing ring, each scale being visible only through its own window 171 or 173. For example, one of the focusing scales may be graduated in one unit of measurement, such as meters, and the other focusing scale visible through the other window may be graduated in other units of measurement, such as feet.

The knurled ring 37 at the front of the tube 31 is necessary in order to provide a convenient place to be grasped by the operator, when the tube is to be slightly turned and moved axially forwardly or rearwardly, from collapsed position to picture-taking position or vice versa. If the lens focusing ring were arranged in the usual conventional way, it would be in front of the knurled ring 37, and it would be relatively wide in an axial direction, in order to have enough space for marking the focusing scale. Thus it would add materially to the overall dimension of the camera in an axial direction. But by the present arrangement, with the main axial length of the focusing ring 175 underlying the knurled ring 37, and with only a relatively thin flange 177 at the front of the knurled ring 37, there is no material lengthening of the camera in the direction of the optical axis. Yet there is adequate space on the part 175 for marking the focusing distance scale, or in fact two separate focusing distance scales graduated in different units of measurement, readily visible through the large windows 171 and 173, while at the same time the serrated flange 177 is easily grasped for manipulation by gripping the parts thereof which are opposite the cutaway portions 171 and 173, and enough of the area of the knurled ring 37 remains (at the right and left sides of the ring) for easy grasping when it is desired to manipulate the ring 37 for retracting or advancing the tube 31. These features thus contribute appreciably to the provision of a very compact camera which is nevertheless easy to operate.

Another feature contributing to the compactness and ease of operation of the camera is the matter of the adjusting disks or reference disks associated with the adjusting knobs 71 and 75 on the front wall of the camera body. These disks are shown at 191 and 193 in FIGS. 1 and 2, rotatably mounted on the front faces of their respective adjusting knobs 71 and 75. Except for the markings on the two disks and on the adjacent parts of the adjusting knobs, the construction of both disks is the same, and a description of one will suffice for both.

Figure 7:
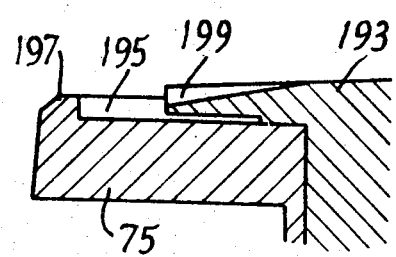
FIG. 7 is a radial section through a fragment of one of the adjusting knobs and its accompanying adjusting disk or reference disk, on an enlarged scale.

In FIG. 7, there is shown a radial section through part of the adjusting knob 75 and its associated disk 193, the head of which is relatively thin in an axial direction and mounted in a shallow annular recess 195 formed concentrically in the front face of the adjusting knob 75. The forward part 197 around the recess 195 is serrated or toothed as indicated in FIG. 2, for easy grasping to turn the knob.

The disk 193 is sufficiently thin in an axial direction so that its front face is preferably flush with the front face of the knob 75, or projects forwardly from the knob only to a very slight extent, as seen in FIGS. 2 and 7. For turning the disk 193 relative to the knob 75, the disk is provided with a few notch-shaped radial slits 199, extending radially inwardly from the circumference of the disk 193 toward the center, through a distance of approximately one-half of the radius of the disk, as seen in FIG. 1, these slots being of decreasing depth from the circumference inwardly, as seen in FIG. 7. Preferably the cross section of each slot is keyway shaped or slightly undercut so that a finger nail of the operator may be easily engaged in a slot to apply pressure to turn the disk 193 relative to the knob 75.

As seen in FIG. 1, these radial grooves 199 are preferably arranged in two groups diametrically opposite each other, each group having, for example, three slots spaced closely from each other, although a greater or lesser number of slots may be used if desired. Sufficient space is left between the groups of slots for marking any desired index marks or reference material on the front face of the disk 193 between the groups of slots. The markings on the disks may be read or interpreted with respect to other markings on the front face of the recess 195 in the front of the knob 75, in the space surrounding the circumference of the disk.

The disk 193 mounted on the knob 75 which controls the diaphragm aperture adjustment, may be adjustable to introduce the factor of film speed or film sensitivity into the exposure mechanism. Thus, for example, the cam 83 (FIG. 4) may be fixed to a sleeve surrounding the shaft 77 of the knob 75, and a connection of any suitable known form turns the sleeve and the cam 83 relative to the shaft 77, when the disk 193 is turned to the knob 75. This introduces the film speed factor into the differential lever control of the exposure meter followup pointer. As shown in FIG. 1, the front face of the disk 193 has two index marks on it, cooperating with film speed scales on the front of the knob 75, one index mark cooperating with a scale graduated in terms of ASA film speed ratings, and the other index mark cooperating with a scale graduated in terms of DIN film speed ratings.

The other disk 191 on the other adjusting knob 71 may be of the same construction, having the same radial grooves 199 for engagement with the finger nail, but this disk 191 is preferably only a reference disk for storage of information. For example, the front of the disk 191 may carry a reference point which is read in conjunction with various indications marked on the front of the disk 71, such as indications of the particular type of film with which the camera is loaded. Thus if some days or weeks elapse after part of the film is used, before the next picture is taken, the operator can look at the position of the index mark on the disk 191 (which he has previously set at the time the camera was loaded with film) and thus can ascertain whether the camera is loaded with daylight film or artificial light film, or with black and white film or color film, or any other appropriate information indicated by the graduations on the front of the knob 71.

It is noted that the knobs 71 and 75 are relatively thin in an axial direction. Only enough thickness is needed (behind the serrated or toothed edge 197 of each knob) to provide a surface on which the necessary graduations may be marked, such as the shutter speed graduations on the periphery of the knob 71, and the diaphragm aperture graduations on the periphery of the knob 75. Since these knobs do not project far from the front face of the camera body, and since the adjusting disks or reference disks 191 and 193 are practically flush with the front faces of the knobs 71 and 75, or project only very slightly beyond these knobs, the construction is very compact.

When the tube 31 is in its rearward or retracted position, the front face of the focusing ring portion 177 projects only slightly beyond the front faces of the knobs 71 and 75 and the disks 191 and 193.

It is to be understood that the disclosure is given by way of illustrative example only, rather that by way of limitation.

I claim:

1. A photographic roll film camera comprising a camera body having a front wall, a lens tube axially movable from a retracted position mainly within said body to an extended picture-taking position mainly projecting forwardly from said body, shutter blades within said tube, diaphragm leaves within said tube, shutter blade driving mechanism including a master member movable through a cycle to open and close said shutter blades, said master member being mounted within said body behind said front wall on one side of said tube, and diaphragm operating mechanism mounted within said body behind said front wall on the opposite side of said tube, both said master member and said diaphragm operating mechanism being in nonobstructing relation to the axial movements of the tube.

2. A photographic roll film camera comprising a camera body having a front wall, a lens tube axially movable from a retracted position mainly within said body to an extended picture-taking position mainly projecting forwardly from said body, shutter blades within said tube, diaphragm leaves within said tube, shutter blade driving mechanism including a master member mounted within said body on one side of said tube, diaphragm operating mechanism mounted within said body on the opposite side of said tube, and two adjusting knobs mounted on the front wall of the camera body immediately in front of said shutter blade driving and diaphragm operating mechanisms, respectively, said knobs having shafts operatively connected to said driving mechanism and said operating mechanism, respectively, to adjust the same.

3. A camera as defined in claim 2, further comprising cams on the shafts of said adjusting knobs, an exposure meter having a followup indicator, and flat lever differential mechanism operated by said cams for moving said followup indicator.

4. A camera as defined in claim 2, further comprising reference disks rotatably mounted on the front faces of said adjusting knobs, the front faces of said disks being approximately flush with the front faces of said knobs.

5. A camera as defined in claim 4, in which said disks have a number of radial fingernail notches which may be engaged by a fingernail to turn a disk relative to the knob on which it is mounted.

6. A camera as defined in claim 5, in which said notches are of wedge shaped cross section.

7. A camera as defined in claim 2, further comprising a filmwinding lever, a shutter release knob, and a lens tube release device all mounted on the upper side of the camera and constituting a group of main operating devices, and a film-rewinding handle, a flash attachment shoe, and a tripod nut all mounted on the lower side of the camera and constituting a group of subsidiary devices, all of said subsidiary devices having lower surfaces lying in the same plane so that they collectively provide a flat surface on the camera which may rest on a flat support.

8. A camera as defined in claim 2, further including a light meter assembly mounted in the upper part of said camera, said assembly including two tubular members with axes substantially vertical and connected to each other by an approximately horizontal member, one tubular member being open at the top for insertion of a measuring instrument of a light meter, the other tubular member being open at the bottom and having a light sensitive element mounted thereon and containing a battery, the battery being insertable in and removable from said other tubular element through the open bottom thereof.

9. A photographic roll film camera comprising a camera body, a lens tube axially movable from a retracted position mainly within said body to an extended picture-taking position mainly projecting forwardly from said body, shutter blades within said tube, diaphragm leaves within said tube, shutter blade driving mechanism mounted within said body on one side of said tube, diaphragm operating mechanism mounted within said body on the opposite side of said tube, a knurled ring at the front of said lens tube, for grasping in order to manipulate the lens to be from retracted position to extended position and vice versa, the knurled ring being cut away at both top and bottom to the extent of about one-quarter of the periphery of the ring, and a focus distance scale drum rotatable concentrically underneath the knurled ring, portions of said drum being visible through two windows resulting from cutting away said knurled ring at top and bottom.

10. A camera as defined in claim 9, wherein rotation of said drum is limited to less than one-half of a full revolution, further including a focus distance scale graduated in one series of units visible through the window at the top of said knurled ring, and another focus distance scale graduated in another series of units visible through the window at the bottom of said knurled ring.

11. A camera as defined in claim 9, in which said scale drum has a radial flange at the forward end thereof lying just in front of said knurled ring, said flange being of slightly less outside diameter than that of said knurled ring and slightly greater outside diameter than that of the cutaway portions of said knurled ring, so that the portions of said flange opposite said cutaway portions of the knurled ring will be accessible for grasping to turn the scale drum, said flange being relatively thin in an axial direction.